United States Patent
Obata et al.

(10) Patent No.: US 12,377,382 B2
(45) Date of Patent: Aug. 5, 2025

(54) PRESSURE SWING ADSORPTION (PSA) DEVICE AND PRESSURE SWING ADSORPTION METHOD

(71) Applicant: ENEOS Corporation, Tokyo (JP)

(72) Inventors: Nanako Obata, Tokyo (JP); Tadashi Seike, Tokyo (JP); Seiji Maeda, Tokyo (JP); Daisaku Tateishi, Tokyo (JP); Ai Minoda, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 1146 days.

(21) Appl. No.: 16/985,733

(22) Filed: Aug. 5, 2020

(65) Prior Publication Data
US 2020/0368667 A1 Nov. 26, 2020

Related U.S. Application Data

(63) Continuation of application No. PCT/JP2019/004593, filed on Feb. 8, 2019.

(30) Foreign Application Priority Data

Feb. 9, 2018 (JP) ................................ 2018-021794

(51) Int. Cl.
*B01D 53/00* (2006.01)
*B01D 53/047* (2006.01)
(Continued)

(52) U.S. Cl.
CPC ............ *B01D 53/047* (2013.01); *B01J 20/18* (2013.01); *B01J 20/20* (2013.01);
(Continued)

(58) Field of Classification Search
CPC ............ B01D 53/047; B01D 2253/102; B01D 2253/108; B01D 2256/16;
(Continued)

(56) References Cited

U.S. PATENT DOCUMENTS

2006/0130402 A1* 6/2006 Wheat ....................... C01B 3/48
                                                          48/197 R
2006/0236861 A1   10/2006 Patel et al.
(Continued)

FOREIGN PATENT DOCUMENTS

CN       101528592        9/2009
EP       2 080 735 A1     7/2009
(Continued)

OTHER PUBLICATIONS

Japanese Office Action issued in JP Application No. 2018-021794 on May 28, 2019, along with machine English translation thereof.
(Continued)

*Primary Examiner* — T. Bennett McKenzie
(74) *Attorney, Agent, or Firm* — GREENBLUM & BERNSTEIN, P.L.C.

(57) ABSTRACT

According to one aspect of the present invention, a pressure swing adsorption (PSA) device includes an adsorption tower configured to introduce hydrogen gas and adsorb impurity components in the hydrogen gas by using a pressure swing adsorption (PSA) method, an adsorbent of one layer made of activated carbon or an adsorbent of two layers in which activated carbon and zeolite are stacked being disposed in the adsorption tower, the hydrogen gas containing carbon monoxide (CO) of 0.5 vol % or more and 6.0 vol % or less and methane ($CH_4$) of 0.4 vol % or more and 10 vol % or less as the impurity components; and a densitometer configured to detect a concentration of CO in the hydrogen gas discharged from the adsorption tower, wherein the impurity components are adsorbed and removed to cause the CO concentration measured by the densitometer to fall below a threshold.

12 Claims, 14 Drawing Sheets

(51) Int. Cl.
  *B01J 20/18*   (2006.01)
  *B01J 20/20*   (2006.01)
  *B01J 20/28*   (2006.01)
  *B01J 20/34*   (2006.01)
  *C01B 3/56*    (2006.01)

(52) U.S. Cl.
  CPC ..... *B01J 20/28052* (2013.01); *B01J 20/3408* (2013.01); *B01J 20/3416* (2013.01); *B01J 20/3458* (2013.01); *C01B 3/56* (2013.01); *B01D 2253/102* (2013.01); *B01D 2253/108* (2013.01); *B01D 2256/16* (2013.01); *B01D 2257/502* (2013.01); *B01D 2257/7025* (2013.01); *B01D 2259/40009* (2013.01); *B01D 2259/40013* (2013.01); *B01D 2259/40028* (2013.01); *B01D 2259/40043* (2013.01); *B01D 2259/4146* (2013.01)

(58) Field of Classification Search
  CPC ...... B01D 2257/502; B01D 2257/7025; B01D 2259/40009; B01D 2259/40013; B01D 2259/40028; B01D 2259/40043; B01D 2259/4146; B01J 20/18; B01J 20/20; B01J 20/28052; B01J 20/3408; B01J 20/3416; B01J 20/3458; C01B 3/56
  USPC .......................................................... 95/12
  See application file for complete search history.

(56) References Cited

U.S. PATENT DOCUMENTS

| | | | |
|---|---|---|---|
| 2011/0005391 A1 | 1/2011 | Cho et al. | |
| 2012/0210873 A1* | 8/2012 | Samura | C01B 33/04 96/110 |
| 2012/0279391 A1* | 11/2012 | Kumar | B01D 53/0476 95/26 |
| 2013/0276630 A1* | 10/2013 | Te Braake | B01D 53/04 95/45 |
| 2014/0053724 A1 | 2/2014 | Raatscher et al. | |
| 2014/0352531 A1* | 12/2014 | Patel | B01D 53/047 96/108 |
| 2016/0325996 A1* | 11/2016 | Matsushima | C01B 23/0015 |

FOREIGN PATENT DOCUMENTS

| | | | |
|---|---|---|---|
| EP | 2 438 975 A1 | 4/2012 | |
| JP | H11 9935 A * | 6/1997 | ............ B01D 53/04 |
| JP | 11-9935 A | 1/1999 | |
| JP | 2004-75485 A | 3/2004 | |
| JP | 2007-209868 A | 8/2007 | |
| JP | WO2008/047828 A1 | 4/2008 | |
| JP | WO2008/056579 A1 | 5/2008 | |
| JP | 2008-539158 A | 11/2008 | |
| JP | 2010-280535 | 12/2010 | |

OTHER PUBLICATIONS

Japanese Office Action issued in JP Application No. 2018-021794 on Nov. 5, 2019, along with machine English translation thereof.
China Office Action and Search Report issued in CN Application No. 201980011692.0, dated Nov. 22, 2021.
International Search Report issued in Patent Application No. PCT/JP2019/004593, dated Apr. 9, 2019, and English language translation.
International Preliminary Report on Patentability/Written Opinion in Patent Application No. PCT/JP2019/004593, dated Aug. 20, 2020, and English language translation.
Extended European Search Report issued in Application No. 19750276.8, dated Oct. 1, 2021.

* cited by examiner

| Impurity | ISO14687-2 Standard Value, volppm | Nine Raw Material-Derived Components of Hydrogen Production Apparatus, volppm |
|---|---|---|
| CO | $\leqq 0.2$ | $\leqq 0.2$ |
| $CH_4$ | $\leqq 100$ | $\leqq 100$ |
| $CO_2$ | $\leqq 2$ | $\leqq 2$ |
| $C_2+$ | $\leqq 2$ | $\leqq 1(C_2H_6)$ |
| $NH_3$ | $\leqq 0.1$ | $\leqq 0.1$ |
| $H_2O$ | $\leqq 5$ | $\leqq 5$ |
| $H_2S$ | $\leqq 0.004$ | $\leqq 0.004$ |
| HCHO | $\leqq 0.01$ | $\leqq 0.01$ |
| HCOOH | $\leqq 0.2$ | $\leqq 0.2$ |
| Entire Halogen | $\leqq 0.05$ | Monitoring by resistivity meter |
| $O_2$ | $\leqq 5$ | Not mixed as an air component or converted into above nine components after reforming |
| $N_2+Ar$ | $\leqq 100$ | Not mixed as an air component or converted into above nine components after reforming |
| He | $\leqq 300$ | Inaccessible |
| Total | $\leqq 300$ | $\leqq 300$ |

FIG.2

Index of Adsorption Strength

| Component | Boiling Point, °C |
|---|---|
| CO | -192 |
| $CH_4$ | -162 |
| $CO_2$ | -89 |
| $C_2H_6$ | -79 |
| $H_2S$ | -60 |
| $NH_3$ | -33 |
| HCHO | -19 |
| $H_2O$ | 100 |
| HCOOH | 101 |

| Test No. | Test 1 | Test 2 | Test 3 | Test 4 | Test 5 | Test 6 | Test 7 | Test 8 | Test 9 |
|---|---|---|---|---|---|---|---|---|---|
| Inlet Side Adsorbent | Activated Carbon 100vol% | Zeolite 100vol% | Activated Carbon 100vol% | Activated Carbon 100vol% | Activated Carbon 50vol% | Activated Carbon 50vol% | Activated Carbon 40vol% | Zeolite 50vol% | Zeolite 40vol% |
| Outlet Side Adsorbent | | | | | Zeolite 50vol% | Zeolite 50vol% | Zeolite 60vol% | Activated Carbon 50vol% | Activated Carbon 60vol% |
| Adsorption Step Pressure | 0.7MPa | 0.7MPa | 0.7MPa | 0.7MPa | 0.7MPa | 0.7MPa | 0.7MPa | 0.7MPa | 0.7MPa |
| CO | 4vol% | 4vol% | 4vol% | 3vol% | 4vol% | 3vol% | 3vol% | 3vol% | 3vol% |
| $CO_2$ | 19vol% | 19vol% | 19vol% | 19vol% | 19vol% | 19vol% | 19vol% | 19vol% | 19vol% |
| $CH_4$ | 5vol% | 5vol% | 5vol% | 7.5vol% | 5vol% | 7.5vol% | 7.5vol% | 7.5vol% | 7.5vol% |
| $C_2H_6$ | 10volppm | 1vol% | 1vol% | 1vol% | 1vol% | 1vol% | 1vol% | 1vol% | 1vol% |
| $H_2S$ | 30volppb | | 30volppb | 50volppm | 30volppb | 50volppm | 50volppm | 50volppm | 50volppm |
| HCHO | 0.4volppm | | 0.4volppm | 4volppm | 0.4volppm | 4volppm | 4volppm | 4volppm | 4volppm |
| HCOOH | 0.4volppm | | 0.4volppm | 4volppm | 0.4volppm | 4volppm | 4volppm | 4volppm | 4volppm |
| $NH_3$ | 200volppm | | 200volppm | 2000volppm | 200volppm | 2000volppm | 2000volppm | 2000volppm | 2000volppm |
| $H_2O$ | 0.84vol% | 0.8vol% | 0.8vol% | 0.8vol% | 0.8vol% | 0.8vol% | 0.8vol% | 0.8vol% | 0.8vol% |
| $H_2$ | Balance | Balance | Balance | Balance | Balance | Balance | Balance | Balance | Balance |
| Breakthrough Order (First and Second) | CO > $CH_4$ | $CH_4$ > CO | CO > $CH_4$ | CO > $CH_4$ | CO > $CH_4$ | CO > $CH_4$ | CO > $CH_4$ | CO = $CH_4$ | CO = $CH_4$ |
| CO/$CH_4$ Ratio | 0.8 | 0.8 | 0.8 | 0.4 | 0.8 | 0.4 | 0.4 | 0.4 | 0.4 |

FIG. 6

| Impurity | Breakthrough Time, min | |
|---|---|---|
| | Test 5 | Test 7 |
| CO | 1.3 | 1.3 |
| $CH_4$ | 1.8 | 1.8 |
| $CO_2$ | 2.3 | 2.8 |
| $C_2H_6$ | 6.8 | 5.8 |
| $NH_3$ | 60 | 186 |
| $H_2O$ | 1154 | 360 |
| $H_2S$ | 48 hours or more | 360 |
| HCHO | | 48 hours or more |
| HCOOH | | |

FIG.11

| | Gas Composition | | | Adsorbent vol% | | Hydrogen Production Apparatus Operation Conditions |
|---|---|---|---|---|---|---|
| | CO vol% | $CH_4$ vol% | $CO/CH_4$ | Activated Carbon | Zeolite | |
| 1 | 0.5~6.0 | 0.4~10 | 0.05~10 | 30~100 | 0~70 | Reformer Temperature : 650℃~900℃<br>Transformer Temperature : 250℃~450℃ |
| 2 | 0.5~3 | 7.5~10 | 00.5~0.4 | 100 | 0 | Reformer Temperature : 650℃~700℃<br>Transformer Temperature : 250℃~320℃<br>Steam/Carbon Ratio = 2~4 |
| 2 | 3~4 | 5~7.5 | 0.4~0.8 | 30~100 | 0~70 | Reformer Temperature : 700℃~800℃<br>Transformer Temperature : 320℃~400℃<br>Steam/Carbon Ratio = 2~4 |
| 3 | 4~6 | 0.4~5 | 0.8~10 | 30~60 | 40~70 | Reformer Temperature : 800℃~900℃<br>Transformer Temperature : 400~450℃<br>Steam/Carbon Ratio = 2~4 |

FIG.15

PRESSURE SWING ADSORPTION (PSA) DEVICE AND PRESSURE SWING ADSORPTION METHOD

CROSS-REFERENCE TO RELATED APPLICATION

This application is a continuation application based upon and claims the benefit of priority from prior Japanese Patent Application No. 2018-021794 (application number) filed on Feb. 9, 2018 in Japan, and International Application PCT/JP2019/004593, the International Filing Date of which is Feb. 8, 2019. The contents described in JP2018-021794 and PCT/JP2019/004593 are incorporated in the present application.

BACKGROUND OF THE INVENTION

Field of the Invention

The present invention relates to a pressure swing adsorption (PSA) device, a hydrogen production apparatus, and a hydrogen production method, for example, an apparatus and a method for producing hydrogen gas used in a hydrogen station for filling a fuel ceil vehicle (FCV) powered by the hydrogen gas with the hydrogen gas.

Description of Related Art

As fuel for vehicles, in addition to conventional fuel oils such as gasoline, recently, hydrogen fuel has attracted attention as a clean energy source. Along with this, FCV vehicles powered by the hydrogen fuel have been developed. Hydrogen stations for the FCV include a hydrogen shipping center or an on-site hydrogen station (hereinafter, referred to as the on-site ST) that is a hydrogen production base, and an off-site hydrogen station (hereinafter, referred to as the off-site ST) that receives and sells hydrogen from the hydrogen production base (the hydrogen shipping center or the on-site ST). At the hydrogen production base for the FCV, for example, liquefied petroleum gas (LPG) is used as a raw material and high-purity hydrogen is produced by a hydrogen production apparatus.

Here, the quality of the hydrogen gas supplied to the FCV needs to conform to the ISO international standard 14687-2. The ISO international standard specifies components that adversely affect the performance of FCV fuel cell stacks among impurity components that may be contained from raw materials or air, in various hydrogen production methods Due to the strict ISO international standard, labor and cost burdens of quality control have become issues at the hydrogen production base.

Conventionally, in order to comply with the strict ISO international standard, for the quality control of hydrogen supplied to the FCV, high-pressure gas is periodically collected from a tip of a filling nozzle of a dispenser for filling the FCV vehicle with hydrogen gas, and the collected gas is analyzed by an analysis company to confirm whether or not it satisfies an ISO standard value. Since the collection at the tip of the nozzle requires a dedicated container and equipment, it takes time to perform sampling. Further, the analysis requires high cost because all 14 components regulated by ISO are analyzed. As such, the current quality of hydrogen gas is secured by the above-described sampling method, and the quality is not continuously controlled at all times. Therefore, in order to improve the quality and reduce the quality control cost, it is desired to establish a method that can constantly perform quality control. Further, the hydrogen gas of a component composition supplied to the FCV can be used not only for fuel for the FCV but also for other applications such as, for example, a home fuel cell. The quality control is also required for the applications other than the fuel of the FCV, and the same issues as described above occur.

Here, a method for separating hydrogen gas from coke oven gas by a PSA method, which has a completely different component composition ratio from the hydrogen gas supplied to the FCV, is disclosed. The coke oven gas includes hydrogen gas (49.5 to 55.4%), oxygen gas ($O_2$) (1.0 to 1.9%), nitrogen gas ($N_2$) (5.8 to 8.7%), methane (25.3 to 28.6%), carbon monoxide. (5.5 to 6.5%), and other components, and the hydrogen gas is separated from the coke oven gas. For this purpose, by introducing the coke oven gas into an adsorption tower in which activated alumina (6 vol %), activated carbon (64 vol %), and synthetic zeolite (30 vol %) are stacked in this order, monitoring a concentration of $N_2$ as component gas to be least adsorbed, and keeping the $N_2$ concentration at 5 ppm or less, the quality control of the hydrogen gas is performed (see JP-A-11-009935, for example). However, unlike the coke oven gas, in hydrogen-rich gas after steam reforming, oxygen gas $O_2$) and nitrogen gas ($N_2$) to be components derived from air, among the 14 components of impurities regulated by ISO, are not mixed as the impurities in the manufacturing process, or even if the gas is mixed in the raw material gas, the gas is converted into other components by a reaction such as reduction (for example, $N_2$ is converted into $NH_3$ or the like). For this reason, the quality control to monitor the N2 concentration described above is difficult.

BRIEF SUMMARY OF THE INVENTION

According to one aspect of the present invention, a pressure swing adsorption (PSA) device includes an adsorption tower configured to introduce hydrogen gas and adsorb impurity components in the hydrogen gas by using a pressure swing adsorption (PSA) method, an adsorbent of one layer made of activated carbon or an adsorbent of two layers in which activated carbon and zeolite are stacked being disposed in the adsorption tower, the hydrogen gas containing carbon monoxide (CO) of 0.5 vol % or more and 6.0 vol % or less and methane ($CH_4$) of 0.4 vol % or more and 10 vol % or less as the impurity components; and a densitometer configured to detect a concentration of CO in the hydrogen gas discharged from the adsorption tower, wherein the impurity components are adsorbed and removed to cause the CO concentration measured by the densitometer to fall below a threshold.

According to another aspect of the present invention, a pressure swing adsorption method includes introducing hydrogen gas into an adsorption tower and adsorbing impurity components in the hydrogen gas by using a pressure swing adsorption (PSA) method, an adsorbent of one layer made of activated carbon or an adsorbent of two layers in which activated carbon and zeolite are stacked being disposed in the adsorption tower, the hydrogen gas containing carbon monoxide (CO) of 0.5 vol % or more and 6.0 vol % or less and methane ($CH_4$) of 0.4 vol % or more and 10 vol % or less as the impurity components; and detecting a concentration of CO in the hydrogen fuel gas discharged from the adsorption tower, wherein the impurity components are adsorbed and removed to cause the CO concentration to fall below a threshold.

According to further another aspect of the present invention, a pressure swing adsorption (PSA) device includes an adsorption tower configured to introduce hydrogen gas and adsorb impurity components in the hydrogen gas by using a pressure swing adsorption (PSA) method, a plurality of layers of adsorbents including an adsorbent of one layer made of activated carbon or an adsorbent of two layers in which activated carbon and zeolite are stacked being disposed in the adsorption tower, the hydrogen gas containing carbon monoxide (CO) of 0.5 vol % or more and 6.0 vol % or less and methane ($CH_4$) of 0.4 vol % or more and 10 vol % or less as the impurity components; and a densitometer configured to detect a concentration of CO in the hydrogen gas discharged from the adsorption tower, wherein the impurity components are adsorbed and removed to cause the CO concentration measured by the densitometer to fall below a threshold.

According to further another aspect of the present invention, a pressure swing adsorption method includes introducing hydrogen gas into an adsorption tower and adsorbing impurity components in the hydrogen gas by using a pressure swing adsorption (PSA) method, a plurality of layers of adsorbents including an adsorbent of one layer made of activated carbon or an adsorbent of two layers in which activated carbon and zeolite are stacked being disposed in the adsorption tower, the hydrogen gas containing carbon monoxide (CO) of 0.5 vol % or more and 6.0 vol % or less and methane ($CH_4$) of 0.4 vol % or more and 10 vol % or less as the impurity components; and detecting a concentration of CO in the hydrogen fuel gas discharged from the adsorption tower, wherein the impurity components are adsorbed and removed to cause the CO concentration to fall below a threshold.

BRIEF DESCRIPTION OF THE DRAWINGS

FIG. 2 is a diagram showing raw material-derived components of a hydrogen production apparatus in an embodiment, corresponding to 14 components whose concentrations are determined by the hydrogen quality standard of ISO14687-2.

FIG. 6 is a diagram showing a volume ratio of activated carbon and zeolite, a ratio of introduced gas, and a result of an adsorption breakthrough test in an embodiment.

FIG. 11 is a diagram showing a desorption time result of an adsorption breakthrough test in an embodiment.

FIG. 15 is a diagram showing a relation between a composition ratio of CO and $CH_4$ of introduced gas and a volume ratio of activated carbon and zeolite in an embodiment.

DETAILED DESCRIPTION OF THE INVENTION

Embodiments below describe a device and a method capable of constantly performing quality control of hydrogen gas of a component composition supplied to an FCV.

First Embodiment

Figure 1:
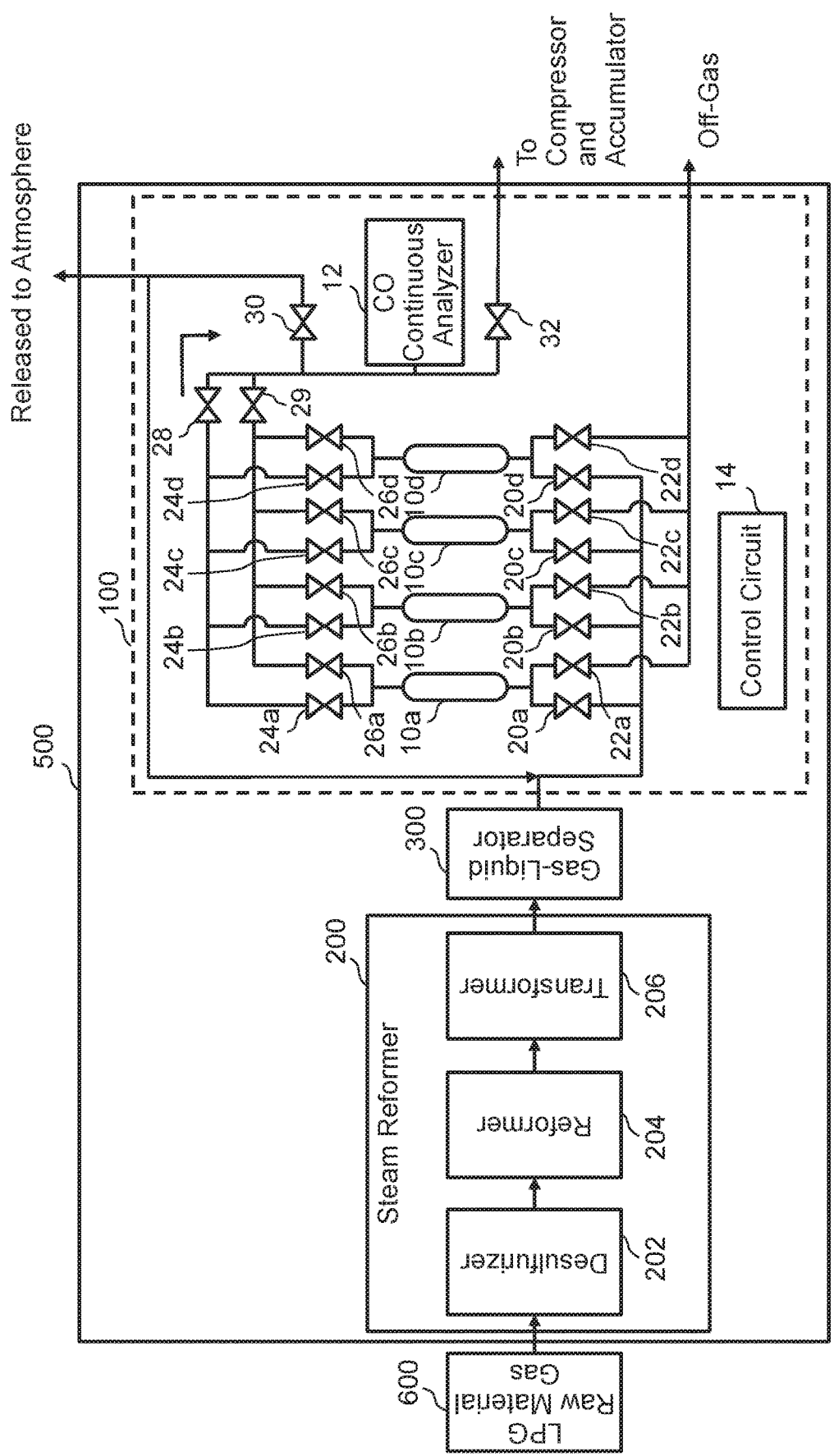
FIG. 1 is an example of a configuration diagram showing a configuration of a hydrogen production apparatus in an embodiment.

FIG. 1 is an example of a configuration diagram showing a configuration of a hydrogen production apparatus in an embodiment. In FIG. 1, a hydrogen production apparatus 500 includes a pressure swing adsorption (PSA) device 100, a steam reformer 200, and a gas-liquid separator 300.

The hydrogen production apparatus 500 is disposed in an on-site ST. For example, using liquefied petroleum gas (LPG) in a tank 600 as a raw material, the hydrogen production apparatus 500 purifies the gas in the order of the steam reformer 200, the gas-liquid separator 300, and the PSA device 100 and produces high-purity hydrogen.

In the steam reformer 200, a desulfurizer 202, a reformer 204, and a transformer 206 are disposed. The LPG in the tank 600 is subjected to desulfurization and steam reforming in the steam reformer 200.

Then, hydrogen-rich gas subjected to the steam reforming is subjected to gas-liquid separation in the gas-liquid separator 300, and is introduced into the PSA device 100.

In the PSA device 100, adsorption towers 10 (a to d), a CO continuous analyzer 12, a control circuit 14, and a plurality of valves 20 (a to d), 22 (a to d), 24 (a to d), 26 (a to d), 30, and 32 are disposed. The entire PSA device 100 is controlled by the control circuit 14. For example, opening and closing of each valve are controlled. The introduced gas introduced into the PSA device 100 is introduced into the adsorption towers 10 via the valves 20. In the example of FIG. 1, a case where the four adsorption towers 10a to 10a are disposed is shown. Therefore, the pipe from the discharge side of the gas-liquid separator 300 is branched into four pipes, each of which is connected to one connection port (here, referred to as a gas introduction port) of each adsorption tower 10 via the valve 20. That is, the gas introduction port side of the adsorption tower 10a is connected by a pipe to the discharge side of the gas-liquid separator 300 via the valve 20a. The gas introduction port side of the adsorption tower 10b is connected by a pipe to the discharge side of the gas-liquid separator 300 via the valve 20b. The gas introduction port side of the adsorption tower 10c is connected by a pipe to the discharge side of the gas-liquid separator 300 via the valve 20c. The gas introduction port side of the adsorption tower 10d is connected by a pipe to the discharge side of the gas-liquid separator 300 via the valve 20d. Further, a pipe of a line different from that of the pipe on the discharge side of the gas-liquid separator 300 is connected to one connection port (gas introduction port) of each adsorption tower 10 via the valve 22, and the pipe of the different line is released to the atmosphere, for example. That is, the gas introduction port side of the adsorption tower 10a is connected by a pipe to the off-gas (atmosphere) side via the valve 22a. The suction side of the adsorption tower 10b is connected by a pipe to the off-gas side via the valve 22b. The gas introduction port side of the adsorption tower 10c is connected by a pipe to the off-gas side via the valve 22c. The gas introduction port side of the adsorption tower 10d is connected by a pipe to the off-gas side via the valve 22d. In the example of FIG. 1, a case where one connection port (gas introduction port) of each adsorption tower 10 is branched into two systems is shown. However, the present invention is not limited thereto, and one connection port may be branched into three or more systems.

Further, the other connection port (here, referred to as the gas discharge port) of each adsorption tower 10 is branched into pipes of lines of two systems, and one of the lines is connected to one side of a valve 28 via the valve 24 in a pipe connection state. That is, the gas discharge port side of the adsorption tower 10a is connected to one side of the valve 28 via the valve 24a. The gas discharge port side of the adsorption tower 10b is also connected to one side of the valve 28 via the valve 24b. The gas discharge port side of the adsorption tower 10c is also connected to one side of the valve 28 via the valve 24c. The gas discharge port side of the adsorption tower 10d is also connected to one side of the valve 28 via the valve 24d.

Although the example of FIG. 1 shows the case where the four adsorption towers 10a to 10d are disposed, the present invention is not limited thereto, and one or more adsorption towers 10 may be disposed.

Further, the other of the lines of the two systems in the other connection port (gas discharge port) of each adsorption tower 10 is connected to one side of a valve 29 via the valve 26 in a pipe connection state. That is, the gas discharge port side of the adsorption tower 10a is connected to one side of the valve 29 via the valve 26a. The gas discharge port side of the adsorption tower 10b is also connected to one side of the valve 29 via the valve 26b. The gas discharge port side of the adsorption tower 10c is also connected to one side of the valve 29 via the valve 26c. The gas discharge port side of the adsorption tower 10d is also connected to one side of the valve 29 via the valve 26d. Although the example of FIG. 1 shows the case where the other connection port (gas discharge port) of each adsorption tower 10 is branched into the two systems, the present invention is not limited thereto, and the other connection port may be branched into three or more systems.

The other sides of the valves 28 and 29 are pipe-connected to each other, and are connected to the valve 32. Further, the supply lines pipe-connected in the other sides of the valves 28 and 29 are branched on the way, and are released to the atmosphere via the valve 30. Alternatively, the supply lines are connected to the gas introduction line of the PSA device 100 via the valve 30 and returned to the gas introduction port side of the adsorption towers 10. Further, the supply lines pipe-connected in the other sides of the valves 28 and 29 are connected to the CO continuous analyzer 12 in the middle of the pipe to the valve 32.

Impurity components of the hydrogen fuel gas introduced into the PSA device 100 are adsorbed with the pressure swing adsorption method, and the hydrogen fuel gas based on high-purity $H_2$ is purified. Then, the purified hydrogen fuel gas is supplied as low-pressure gas of less than 1 MPaG (atmospheric pressure basis), for example, 0.7 MPaG, to a compressor or an accumulator in a hydrogen station, for example.

Here, in FIG. 1, the configuration necessary for describing the embodiment is described. The hydrogen production apparatus 500 may generally include other necessary configuration. For example, although illustration of a control circuit for controlling the entire hydrogen production apparatus 500 is omitted, it goes without saying that the control circuit is included.

In the embodiment, quality control of produced hydrogen is continuously performed at all times by using a method called "canary component control". The "canary component control" is a method for using, as an index, an impurity component which is least removed in a hydrogen purification step and is easily mixed into a product to monitor a concentration of only the component using a continuous analyzer. In addition, the method is a control method in which, if a value of the canary component is a control value or less, values of other impurities are also specified values or less, and product hydrogen is maintained at a target purity.

In the "canary component control" method in the hydrogen production apparatus 500 in the embodiment, CO, which is an impurity in hydrogen, is determined as the canary component, and the quality of hydrogen is maintained by constantly monitoring the CO concentration as an index with the CO continuous analyzer 12 (IR). As described above, because the quality can be secured constantly online without any outsourcing cost for analysis, it can be said that the CO canary component control method is an excellent quality control method.

The CO canary component control is performed by the continuous analyzer after the hydrogen purification step of the hydrogen production apparatus. In the example of FIG. 1, by adopting a pressure swing adsorption method (between a normal pressure and, for example, 1.5 MPa) by the PSA device 100 in the hydrogen purification step after a steam reforming step of the hydrogen production apparatus 500, the hydrogen purity in the steam reforming gas can be increased from about 70% to 99.97% or more. Each of the adsorption towers 10 is filled with two kinds of adsorbents (activated carbon and zeolite) or one kind of adsorbent (activated carbon), and the hydrogen purity is increased by removing impurities using a difference in the adsorption strengths and the adsorption speeds between the adsorbents and the impurity components.

The activated carbon used as the adsorbent is, for example, a material using carbon substances such as coal and coconut, shell as raw materials (charcoal, coconut shell coal, coal (lignite, brown coal, bituminous coal, anthracite, and the like, oil carbon, and phenolic resin), and is a material mainly made of carbon with micropores (diameter: 10 to 200 Å (10 Å=1 nm)) formed by reacting with gas or chemicals at a high temperature. For example, 90% or more is carbon, and a part of carbon is a compound with oxygen and hydrogen. Ash is a component unique to the raw material and includes Na, Si, K, Ca, Fe, and the like. These micropores are formed in a mesh shape inside carbon, walls of the micropores have a large surface area (500 to 2500 m²/g), and various substances are adsorbed on the surface. In most activated carbon, for example, 90% or more is carbon, and part of carbon is a compound with oxygen and hydrogen. Ash is a component unique to the raw material and includes Na, Si, K, Ca, Fe, and the like. The shape may be granular or molded. As the activated carbon, for example, "Granular Shirasagi X2M (Morshibon 5A)" manufactured by Osaka Gas Chemical Company is preferably used. It is also preferable to use activated carbon "Kuraray Coal (registered trademark)" GA manufactured by Kuraray.

As the zeolite, for example, A type zeolite (Ca-A type/Na-A type zeolite) and X type zeolite (Ca-X type/Na-X type) are preferable. As the zeolite, for example, ZEOLUM "A-5 calcium (type: SA-500A)" or "F-9 calcium (type: SA-600A)" manufactured by Tosoh Corporation is preferably used.

Here, the reason why CO is determined as the canary component in the hydrogen production apparatus 500 is that CO is considered to be a component which is not easily adsorbed on the activated carbon or the zeolite and is easily desorbed, and a component which is quickly mixed into hydrogen among impurity components. Next, an outline of operation control of the PSA device 100 will be described.

First, the steam-reformed gas is introduced into the adsorption tower 10 of the PSA device 100, and is maintained at a predetermined pressure while being pressurized. During that time, the high-purity hydrogen is extracted while the impurities included in the hydrogen gas are adsorbed on the adsorbent. When the pressurization step is completed, depressurization (normal pressure) is started, and the impurities adsorbed on the adsorbent are desorbed using the high-purity hydrogen. This is a mechanism for removing the impurity components by repeating the pressurization step and the depressurization step in a short time. Most of the impurities are mainly removed by the activated carbon filled in the gas introduction port of the adsorption tower 10. The adsorption of the impurities with the activated carbon and the zeolite is reversible adsorption called physical adsorption, and it is considered that the impurities adsorbed in the depressurization step are almost desorbed. However, when the adsorbent reaches saturation by the impurities due to the deterioration of the adsorbent or the like, the impurities are mixed into the product hydrogen in an adsorption step. This phenomenon is called "breakthrough".

Here, in technical examinations and experimental results described in an operation guideline for hydrogen quality control, $N_2$, CO, $CO_2$, $CH_4$, $O_2$, and $H_2O$, which are main components, are analyzed and confirmed. For $H_2S$, HCHO, HCOOH, and $NH_3$, which are trace components, a thermodynamic equilibrium concentration is only considered to be sufficiently low, and no actual analysis is performed. However, when the trace components are not adsorbed by the PSA device 100 even if the thermodynamic equilibrium concentration is sufficiently low, the concentration may exceed the standard sufficiently. Therefore, it is necessary to confirm whether or not the trace components are more easily adsorbed than CO.

Further, it is estimated that it is difficult to adsorb CO and $CH_4$ in the PSA after steam reforming. The activated carbon has the role of mainly adsorbing $CH_4$ and the zeolite has the role of mainly adsorbing CO. In the case of performing the CO canary component control, if an amount of activated carbon is small or the adsorption capacity is reduced due to the deterioration of the activated carbon, the component that is least adsorbed becomes $CH_4$, and the CO canary component control is not established. Further, when the impurity concentration at the inlet of the PSA device 100 changes due to the deterioration of the catalyst in the steam reforming and the ratio of $CH_4$ in the introduced gas increases, the CO canary component control is not established. Therefore, when the CO canary component control is performed, a combination of the composition of the impurity components of the introduced gas and the composition of the adsorbents becomes important. In the method for separating hydrogen gas from coke oven gas by the PSA method described above (Published Unexamined Japanese Patent Application No. H11-009935 (JP-A-H11-009935)), since the ratio of $CH_4$ is larger than that of the hydrogen gas fuel of the component composition supplied to the FCV, planned in the embodiment, it becomes difficult to establish the CO canary component control.

FIG. 2 is a diagram showing raw material-derived components of the hydrogen production apparatus in the embodiment, corresponding to 14 components whose concentrations are determined by the hydrogen quality standard of ISO14687-2. Among the 14 components determined by the ISO hydrogen quality standard (ISO14687-2) shown in FIG. 2, 9 components (upper nine impurities in a table) which may be produced from components (C, H, N, S, O, and the like) included in the raw material in the hydrogen production process are mixed as impurity components, in the hydrogen production apparatus 500 in the embodiment. Among the remaining components, halogen may be dissolved in water required for the steam reforming reaction and may be mixed. However, since a resistivity meter is used to constantly monitor that a mixing amount is a specified value or less, it can be ignored in the gas introduced into the PSA device 100. Further, four components of oxygen, nitrogen, argon, and helium (He) are components contained in the air, and the inside of the hydrogen production apparatus 500 is at a high pressure, so that there is substantially no possibility of air mixing from the outside. In the ISO hydrogen quality standard, since there are many components to be controlled and concentration levels to be controlled are extremely small, at present, it is very difficult to perform the quality control to continue to comply with the standard. Therefore, if the canary component can be found from 9 impurity components that may be generated from the raw material component and the "canary component control" method can be applied to the hydrogen quality control, analysis cost reduction and improvement in the quality of the quality control by constantly monitoring the impurity components can be achieved, and the problem of the quality control can be solved.

Figures 3, 4:
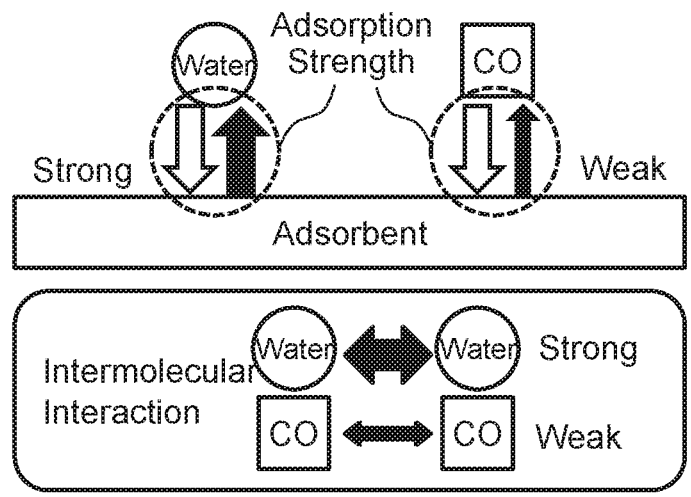
FIG. 3 is a diagram illustrating a mechanism of adsorption and desorption of an impurity component on a PSA adsorbent in an embodiment.
FIG. 4 is a diagram showing the order of intermolecular interactions of impurity components based on an index of a strength of adsorption in an embodiment.

FIG. 3 is a diagram illustrating a mechanism of adsorption and desorption of an impurity component on a PSA adsorbent in the embodiment. It is said that the "adsorption strength" between the adsorbent and the impurity component is determined by the intermolecular force of the impurity component. As shown in FIG. 3, if it is considered that both the attraction of the adsorbent and the attraction of the impurity component act on the adsorbent surface and it is considered that the attraction of the adsorbent acts equally on each impurity component on the same adsorbent surface, the order of the magnitude of the adsorption strength between the adsorbent and the impurity component is determined by the intermolecular force of the impurity component. That is, the order is the same as the order of the magnitude of the intermolecular interaction of the impurity component.

FIG. 4 is a diagram showing the order of intermolecular interactions of impurity components based on an index of the strength of adsorption in the embodiment. For the order of the intermolecular interactions of the impurity components, a difference in "boiling point" is exemplified as a familiar physical quantity. This means that the larger the intermolecular interaction, the more a liquid state is maintained, and the smaller the intermolecular interaction, the more easily the liquid is vaporized. In other words, this means that the smaller the intermolecular interaction, the lower the "boiling point". If the "boiling points" are compared, it can be seen that the intermolecular interaction is weakest for CO, as shown in FIG. 4. That is, this means that CO is hardly adsorbed on the adsorbent and performs breakthrough first. From this, it can be seen that, when adsorption/desorption is controlled by the "adsorption strength", CO becomes a candidate for the canary component.

Further, in the embodiment, an actual PSA device is simulated to confirm the canary component, and an adsorption breakthrough test is performed to determine the component that is first adsorbed and performs breakthrough, in the presence of a plurality of impurities.

Figure 5:
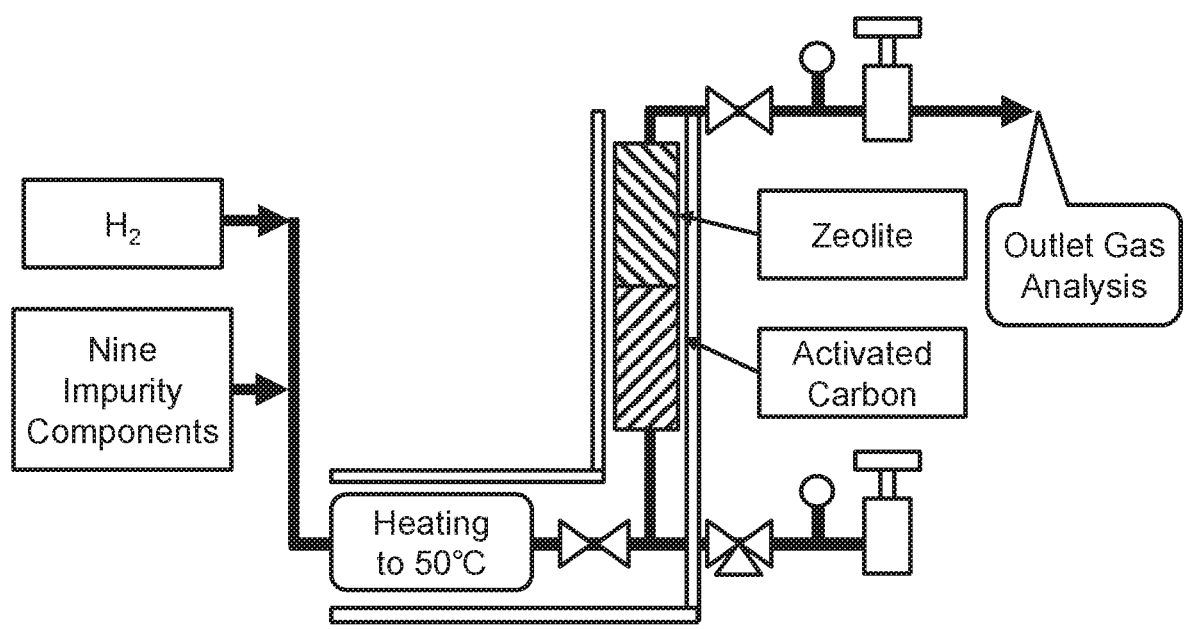
FIG. 5 is a diagram showing a configuration of a PSA simulation device in an embodiment.

FIG. 5 is a diagram showing a configuration of a PSA simulation device in the embodiment. As shown in FIG. 5, mixed gas containing 9 impurity components in hydrogen is heated to 50° C. and introduced into the adsorption tower filled with the activated carbon and the zeolite. After the introduction of the mixed gas, the gas is regularly sampled from the outlet of the adsorption tower, and the components performing breakthrough from the adsorption tower are analyzed. Further, in the example of FIG. 5, the test is performed under the following test conditions.

Adsorption tower internal temperature: 50° C.
Adsorption tower internal pressure: 0.7 MPaG
Adsorption tube inner diameter: 21.1 mmφ
Adsorption tube: 90 mm
Filling layer height: 82 mm
Filling deposit: 28 cc
Gas flow rate: 0.41 NL/min
<Analytical Instruments>
GC-TCD (CO, $CH_4$, and $CO_2$)
GC-FID ($C_2H_6$)
GC-FPD ($H_2S$)
GC-MS (HCHO)
IC (ion chromatograph) (HCOOH)
Detection tube (HCHO), ($NH_3$)

FIG. 6 is a diagram showing a volume ratio of activated carbon and zeolite, a ratio of introduced gas, and a result of an adsorption breakthrough test in the embodiment. FIG. 6 shows the volume ratio of the activated carbon and the zeolite, the ratio of the introduced gas, and the result of the adsorption breakthrough test for each of Tests 1 to 9.

In Test 1, for hydrogen-rich introduced gas containing impurity components of CO (4 vol %), $CH_4$ (5 vol %), $CO_2$ (19 vol %), $C_2H_6$ (1 vol %), and $H_2O$ (0.80 vol %), an adsorption breakthrough test was performed using an adsorbent of 100 vol % activated carbon.

In Test 2, for hydrogen-rich introduced gas containing the impurity components of CO (4 vol %), $CH_4$ (5 vol %), $CO_2$ (19 vol %), $C_2H_6$ (1 vol %), and $H_2O$ (0.80 vol %) similar to Test 1 described above, an adsorption breakthrough test was performed using an adsorbent of 100 vol % zeolite.

In Test 3, for hydrogen-rich introduced gas containing the impurity components of CO (4 vol %), $CH_4$ (5 vol %), $CO_2$ (19 vol %), $C_2H_6$ (1 vol %), and $H_2O$ (0.80 vol %) similar to Test 1 described above and impurity components of $NH_3$ (200 volppm), $H_2S$ (30 volppb), HCHO (0.4 volppm) and HCOOH (0.4 volppm), an adsorption breakthrough test was performed using an adsorbent of 100 vol % activated carbon.

In Test 4, for hydrogen-rich introduced gas containing impurity components of CO (3 vol %), $CH_4$ (7.5 vol %), $CO_2$ (19 vol %), $C_2H_6$ (1 vol %), $H_2O$ (0.8 vol %), $NH_3$ (2000 volppm), $H_2S$ (50 volppm), HCHO (4 volppm), and HCOOH (4 volppm), an adsorption breakthrough test is performed using an adsorbent of 100 vol % activated carbon. Test 4 was performed under severe conditions due to impurities more than those in the gas introduced in Tests 1 to 3. As shown in FIG. 6, the amount of CO in the introduced gas was decreased from 4% to 3% and the amount of $CH_4$ was increased from 5% to 7.5%, as compared with the introduced gas concentrations in Tests 1 to 3, so that Test 4 was under conditions in which CO was more difficult to be desorbed first. Further, Test 4 is under severe conditions in which $H_2S$ is 50 ppm to be the upper limit of an LPG standard value, and the concentration of each of $NH_3$, HCHO, and HCOOH is increased to 10 times the concentration of the introduced gas in Tests 1 to 3.

In Test 5, for hydrogen-rich introduced gas containing the impurity components of CO (4 vol %), $CH_4$ (5 vol %), $CO_2$ (19 vol %), $C_2H_6$ (1 vol %), $H_2O$ (0.80 vol %), $NH_3$ (200 volppm), $H_2S$ (30 volppb), HCHO (0.4 volppm), and HCOOH (0.4 volppm) similar to Test 3 described above, an adsorption breakthrough test was performed using an adsorbent of two layers stacked in the order of 50 vol % activated carbon and 50 vol % zeolite from the gas introduction port side.

In Test 6, for hydrogen-rich introduced gas containing the impurity components of CO (3 vol %), $CH_4$ (7.5 vol %), $CO_2$ (19 vol %), $C_2H_6$ (1 vol %), $H_2O$ (0.8 vol %), $NH_3$ (2000 volppm), $H_2S$ (50 volppm), HCHO (4 volppm), and HCOOH (4 volppm) similar to Test 4 described above, an adsorption breakthrough test was performed using an adsorbent of two layers stacked in the order of 50 vol % activated carbon and 50 vol % zeolite from the gas introduction port side.

In Test 7, for hydrogen-rich introduced gas containing the impurity components of CO (3 vol %), $CH_4$ (7.5 vol %), $CO_2$ (19 vol %), $C_2H_6$ (1 vol %), $H_2O$ (0.8 vol %), $NH_3$ (2000 volppm), $H_2S$ (50 volppm), HCHO (4 volppm), and HCOOH (4 volppm) similar to Test 4 described above, an adsorption breakthrough test was performed using an adsorbent of two layers stacked in the order of 40 vol % activated carbon and 60 vol % zeolite from the gas introduction port side.

In Test 8, for hydrogen-rich introduced gas containing the impurity components of CO (3 vol %), $CH_4$ (7.5 vol %), $CO_2$ (19 vol %), $C_2H_6$ (1 vol %), $H_2O$ (0.8 vol %), $NH_3$ (2000 volppm), $H_2S$ (50 volppm), HCHO (4 volppm), and HCOOH (4 volppm) similar to Test 4 described above, an adsorption breakthrough test is performed using an adsorbent of two layers stacked in the order of 50 vol % zeolite and 50 vol % activated carbon from the gas introduction port side.

In Test 9, for hydrogen-rich introduced gas containing the impurity components of CO (3 vol %), $CH_3$ (7.5 vol %), $CO_2$ (19 vol %), $C_2H_6$ (1 vol %), $H_2O$ (0.8 vol %), $NH_3$ (2000 volppm), $H_2S$ (50 volppm), HCHO (4 volppm), and HCOOH (4 volppm) similar to Test 4 described above, an adsorption breakthrough test was performed using an adsorbent of two layers stacked in the order of 40 vol % zeolite and 60 vol % activated carbon from the gas introduction port side.

Here, the tests (1 to 3 and 5) using introduced gas with a typical composition of hydrogen gas supplied to the FCV and the tests (4 to 6 and 9) using introduced gas with a composition that reduces CO and increases $CH_4$, which are under conditions for the CO canary component control, on the basis of a thermodynamic equilibrium calculation value of the steam reforming reaction, are performed.

Further, in Test 7, assuming the deterioration (for example, the deterioration due to water) of the adsorbent in the purification step, an adsorbent was used in which the ratio of activated carbon is reduced by 10 vol % and the ratio of zeolite is increased by 10 vol %, in addition to the component composition of the introduced gas in Test 6. If a more severe deterioration was assumed from that the residue of water of the activated carbon was 5 wt % and the amount of activated carbon was reduced by assuming a deterioration of 20 wt % of the activated carbon, the volume of activated carbon was reduced by 10 vol %. As the deterioration of the adsorbent, the deterioration proceeds from the activated carbon at the inlet side of the adsorption tower. Therefore, if the adsorption of zeolite becomes dominant due to the deterioration of activated carbon, it would be easy for methane to be adsorbed and perform breakthrough first. Therefore, by reducing the ratio of activated carbon, conditions were set in which CO is more difficult to be desorbed first.

Figure 7:
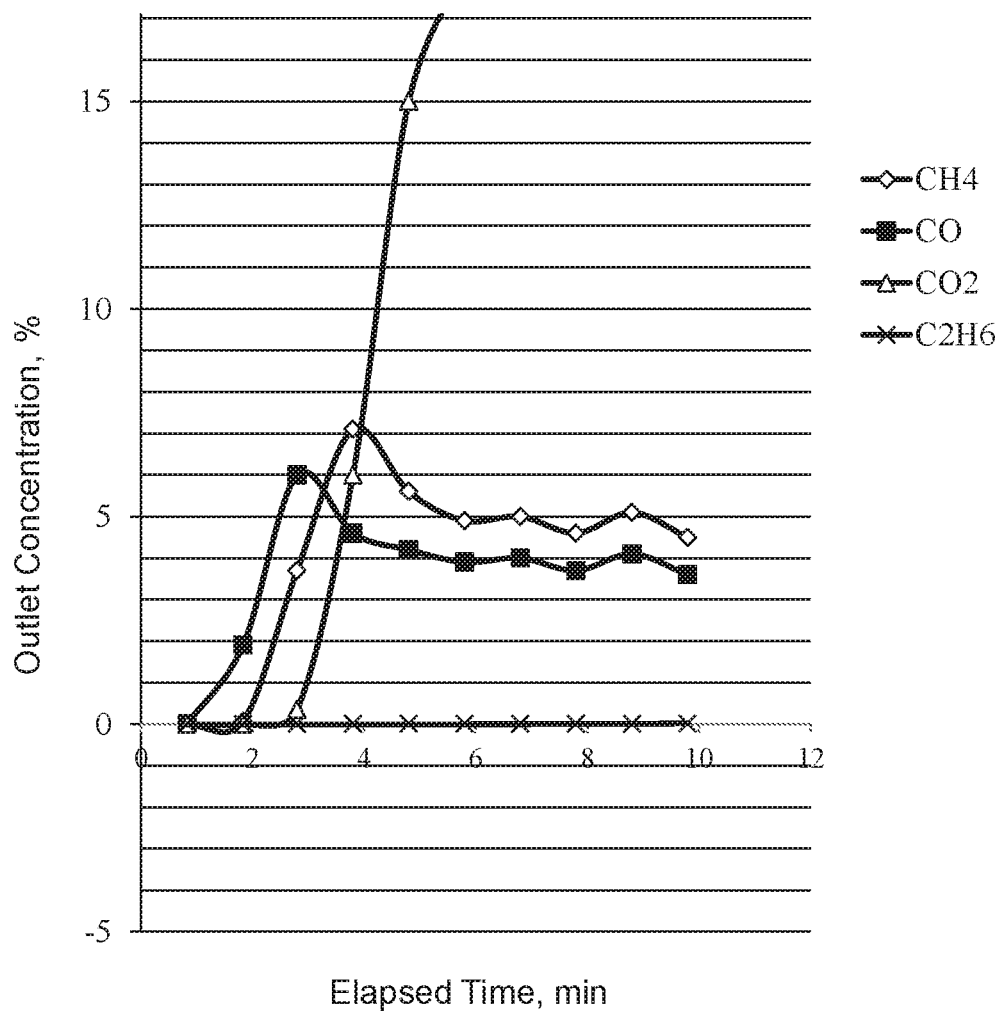
FIG. 7 is a diagram showing a relation between an outlet concentration and an elapsed time based on a result of an adsorption breakthrough test when an adsorbent is one layer of activated carbon in an embodiment.

FIG. 7 is a diagram showing a relation between an outlet concentration and an elapsed time based on a result of an adsorption breakthrough test when an adsorbent is one layer of activated carbon in the embodiment. In FIG. 7, a vertical axis represents an outlet concentration and a horizontal axis represents an elapsed time. FIG. 7 shows the result of Test 1. As shown in FIG. 7, in Test 1, it is confirmed that CO performs breakthrough first. Similarly, in Test 3, which includes impurity components of trace components such as $NH_3$, $H_2S$, HCHO, and HCOOH, it is confirmed that CO performs breakthrough first. Similarly, in Test 4 in which CO under the severe conditions is reduced and $CH_4$ is increased, it is confirmed that CO performs breakthrough first. Therefore, when the hydrogen-rich gas containing 3 to 4 vol % of CO and 5 to 7.5 vol % of $CH_4$ among the impurity components is introduced into the PSA device 100, CO can be converted into the canary component with an adsorbent of one layer of activated carbon.

Figure 8:
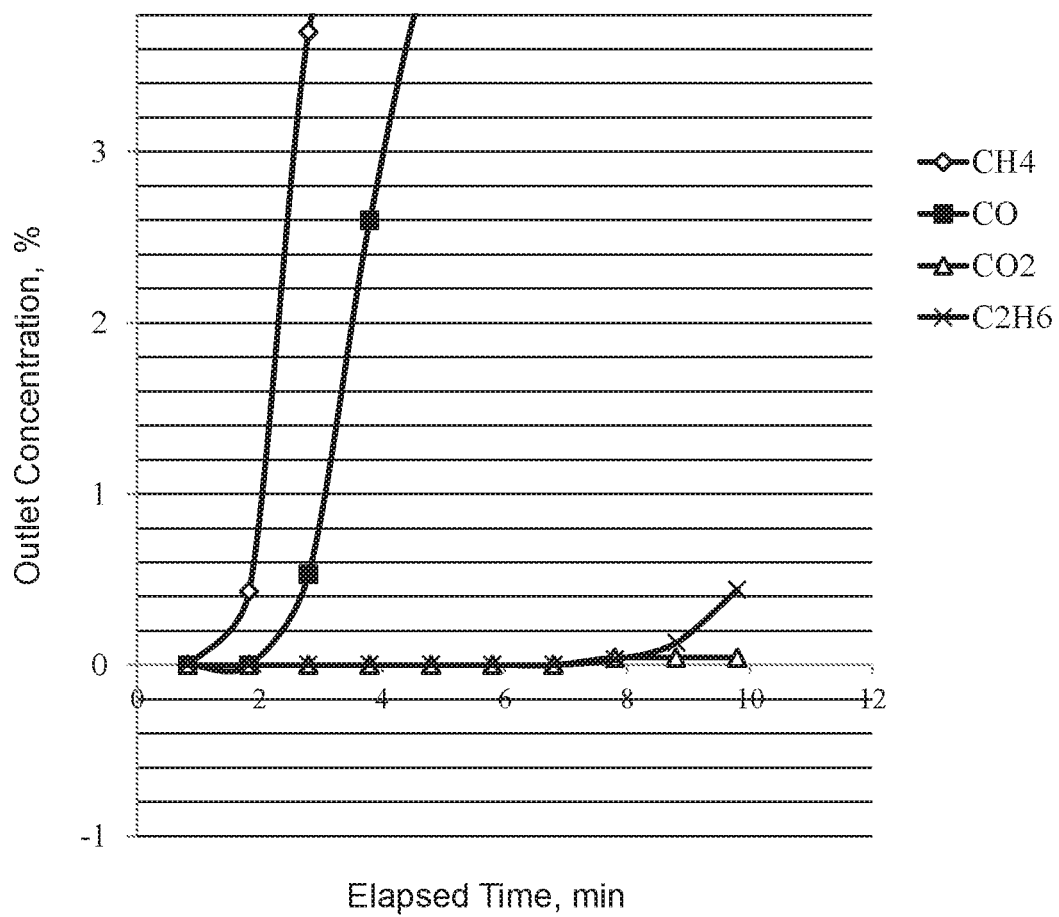
FIG. 8 is a diagram showing a relation between an outlet concentration and an elapsed time based on a result of an adsorption breakthrough test when an adsorbent is one layer of zeolite in an embodiment.

FIG. 8 is a diagram showing a relation between an outlet concentration and an elapsed time based on a result of an adsorption breakthrough test when an adsorbent is one layer of zeolite in the embodiment. In FIG. 8, a vertical axis represents an outlet concentration and a horizontal axis represents an elapsed time. FIG. 8 shows the result of Test 2. As shown in FIG. 8, in Test 2, it is confirmed that $CH_4$ performs breakthrough first. Therefore, when the hydrogen-rich gas containing 4 vol % of CO and 5 vol % of $CH_4$ among the impurity components is introduced into the PSA device 100, CO cannot be converted into the canary component with an adsorbent of one layer of zeolite. The same is also applied to the case where CO is reduced and $CH_4$ is increased, which is a severe condition.

Figure 9:
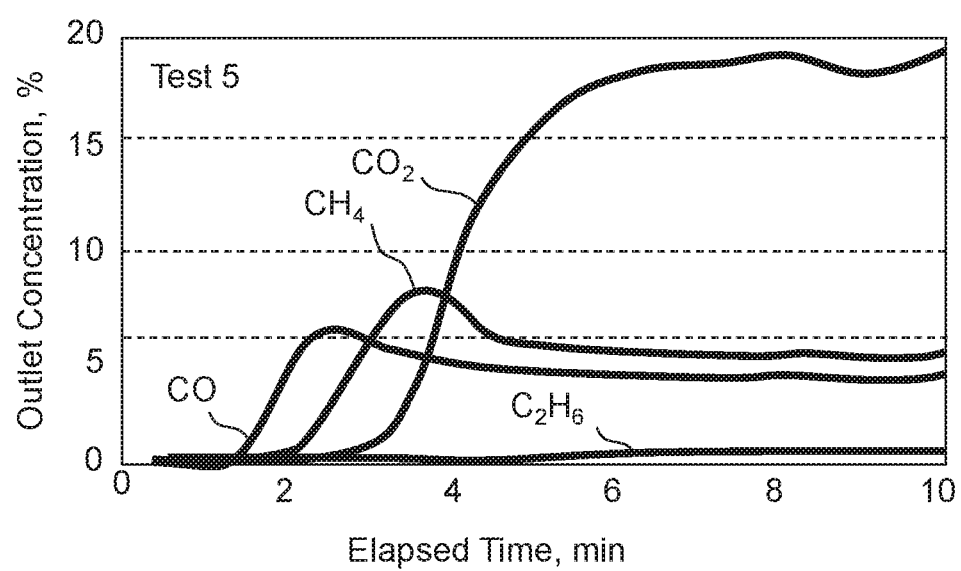
FIG. 9 is a diagram showing an example of a relation between an outlet concentration and an elapsed time based on a result of an adsorption breakthrough test when an adsorbent is two layers of activated carbon and zeolite in an embodiment.

FIG. 9 is a diagram showing a relation between an outlet concentration and an elapsed time based on a result of an adsorption breakthrough test when an adsorbent is two layers of activated carbon and zeolite in the embodiment. In FIG. 9, a vertical axis represents an outlet concentration and a horizontal axis represents an elapsed time. FIG. 9 shows the result of Test 5. As shown in FIG. 9, in Test 5, it is confirmed that CO performs breakthrough first. Other impurities are detected later or cannot be detected in time.

Figure 10:
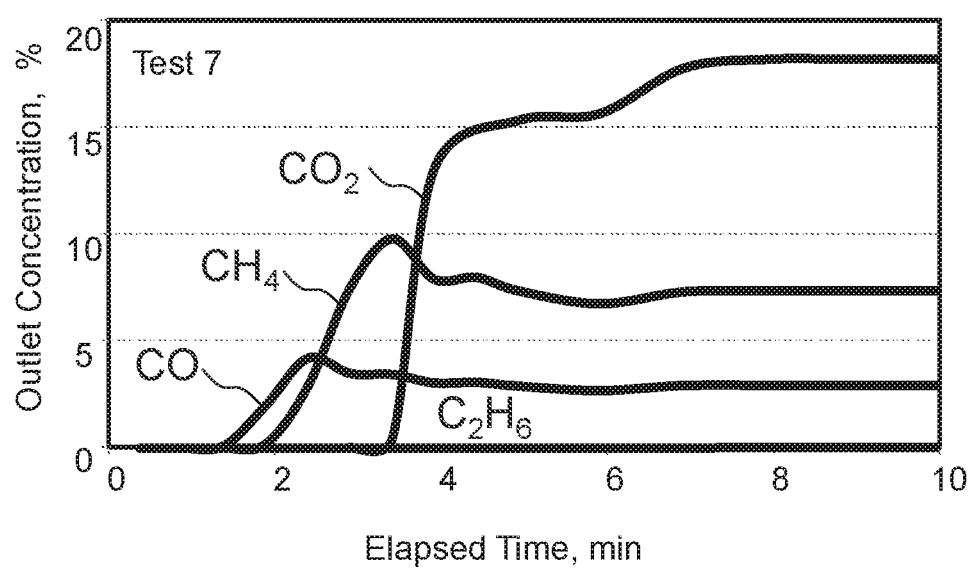
FIG. 10 is a diagram showing another example of a relation between an outlet concentration and an elapsed time based on a result of an adsorption breakthrough test when an adsorbent is two layers of activated carbon and zeolite in an embodiment.

FIG. 10 is a diagram showing another example of a relation between an outlet concentration and an elapsed time based on a result of an adsorption breakthrough test when an adsorbent is two layers of activated carbon and zeolite in the embodiment. In FIG. 10, a vertical axis represents an outlet concentration and a horizontal axis represents an elapsed time. FIG. 10 shows the result of Test 7. As shown in FIG. 10, by reducing the ratio of activated carbon as compared with Test 6, which is set as severe conditions in which CO is more difficult to perform breakthrough first than the introduced gas in Test 5, in Test 7 set as conditions in which CO is more difficult to be desorbed first, it is confirmed that CO performs breakthrough first. Therefore, in Test 6, it is clear that CO performs breakthrough first, but in Test 6, it is confirmed that CO performs breakthrough first. Other impurities are detected later or cannot be detected in time.

Further, in both cases of Tests 8 and 9, it is confirmed that CO and $CH_4$ simultaneously perform breakthrough first. However, in both cases of Tests 8 and 9, it is confirmed that the $CH_4$ concentration is less than 100 volppm of the ISO standard at the stage where the CO concentration is 0.2 volppm of the ISO standard. Therefore, in the case of introducing into the PSA device 100 hydrogen-rich gas containing CO of 3 to 4 vol % and $CH_4$ of 5 to 7.5 vol % among the impurity components described above, it can be seen that a volume ratio between activated carbon and zeolite can be adjusted between a ratio of 40:60 and a ratio of 100:0 (that is, only one layer of activated carbon) in order to convert CO into the canary component. In the first embodiment, the following calculation was further performed to confirm whether or not the ratio is a limit value.

FIG. 11 is a diagram showing a desorption time result of the adsorption breakthrough test in the embodiment. As shown in FIG. 11, in both Test 5 and Test 7 set as conditions in which CO is more difficult to be desorbed first by reducing the ratio of activated carbon as compared with Test 6 set as severe conditions in which CO is more difficult to perform breakthrough first than the introduced gas in Test 5, a breakthrough time of $CH_4$ is the same.

Figure 12:
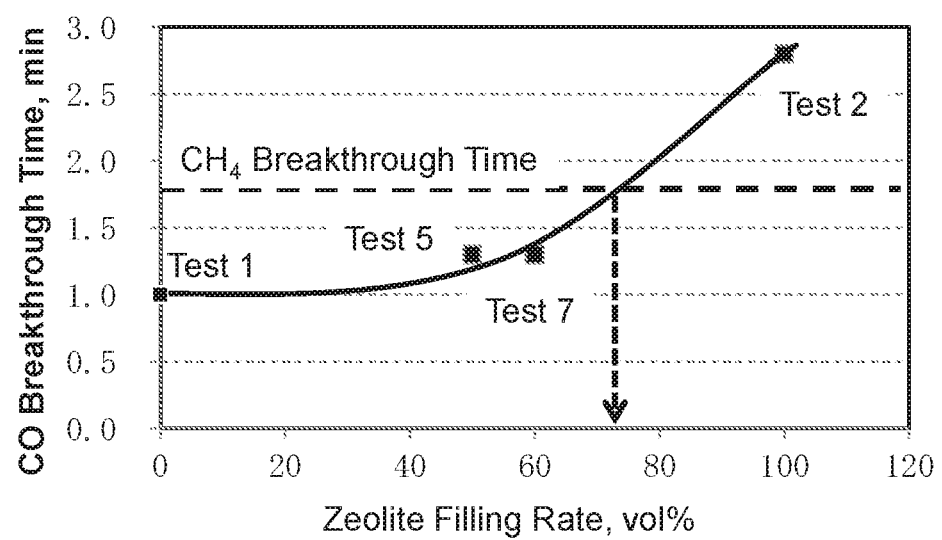
FIG. 12 is a diagram showing a relation between a CO breakthrough time and a zeolite volume ratio in an embodiment.

FIG. 12 is a diagram showing a relation between a CO breakthrough time and a zeolite volume ratio in the embodiment. FIG. 11 is a diagram plotting a CO breakthrough time in Test 2 using an adsorbent of zeolite 100 vol %, a CO breakthrough time in Test 5 using an adsorbent of two layers stacked in the order of activated carbon 50 vol % and zeolite 50 vol % from the gas introduction port side, a CO breakthrough time in Test 7 using an adsorbent of two layers stacked in the order of activated carbon 40 vol % and zeolite 60 vol % from the gas introduction port side, and a CO breakthrough time in Test 1 using an adsorbent of activated carbon 100 vol % and zeolite 0 vol %. Note that, in all Tests 1 to 9, a breakthrough time of $CH_4$ is the same. Therefore, it is confirmed that the volume ratio of zeolite at the breakthrough time of $CH_4$ on an approximate curve approximated using the CO breakthrough times in Tests 1, 2, 5, and 7 is about 70 vol %. This result means that, when an adsorbent of two layers stacked in the order of activated carbon 30 vol % and zeolite 70 vol % from the gas introduction port side is used, CO performs breakthrough first. Therefore, CO can be used as the canary component until the volume ratio of zeolite is 70 vol %. Therefore, in the case of introducing into the PSA device 100 hydrogen-rich gas containing CO of 3 to 4 vol % and $CH_4$ of 5 to 7.5 vol % among the impurity components described above, on the basis of the calculation, it can be seen that a volume ratio between activated carbon and zeolite can be adjusted between a ratio of 30:70 and a ratio of 100:0 (that is, only one layer of activated carbon) in order to convert CO into the canary component. In other words, in each adsorption tower 10 (a to d), an adsorbent of one layer of 100 vol % activated carbon or an adsorbent of two layers in which activated carbon of 30 vol % or more and less than 100 vol % and zeolite of more than 0 vol % and 70 vol % or less are stacked is disposed. Preferably, an adsorbent of two layers in which activated carbon of 50 vol % or more and less than 60 vol % and zeolite of 40 vol % or more and 50 vol % or less are stacked is disposed. Further, if a ratio is within the range of ratios described above, the volume ratios of activated carbon and zeolite may be different in the adsorption towers 10 (a to d).

Further, in order to confirm a desorption state of the impurities attached to the activated carbon, a desorption test was performed by only the activated carbon using the introduced gases in Tests 5 and 6. In a method of the desorption test, gas at the time of depressurization after the adsorption breakthrough test and cleaning gas at the time of performing hydrogen cleaning several times were sampled at the outlet of the adsorption tower and were analyzed. As a result, $CO_2$ had the largest cumulative desorption amount as compared with other impurities. The reason is considered to be that the adsorption power is relatively strong and the concentration of the introduced gas of impurities in the characteristic breakthrough test is the highest. It can be seen that most of the CO and $CH_4$ components with the weakest adsorption power are desorbed in the initial hydrogen cleaning, and $H_2S$, $NH_3$, and $CO_2$ with the strong adsorption power are gradually desorbed.

Further, impurity residues of activated carbon and zeolite after Tests 5 to 7 were analyzed. (Since water residue analysis was not possible at the same time, a water residue amount was measured separately.) As a result, next to 5 wt % of $H_2O$, $CO_2$ had the largest residue amount. Since the residue amount of $CO_2$ is 1/70 or less as compared with the residue amount of water of activated carbon of 5 wt % (with respect to the weight of the adsorbent), it can be seen that water is dominant in the degradation of activated carbon.

From the above test results, it can be seen that CO can be used as the canary component among the 9 impurity components which may be generated from the raw material components, including $H_2S$, HCHO, HCOOH, and $NH_3$, which are trace components. Therefore, it can be seen that the canary component control by CO is established.

On the basis of the above, in the embodiment, a method for maintaining the quality of hydrogen by determining CO to be an impurity in hydrogen as the canary component and constantly monitoring the CO concentration as an index with the CO continuous analyzer 12 (IR) within a concentration defined in the ISO hydrogen quality standard will be specifically described below.

Figure 13:
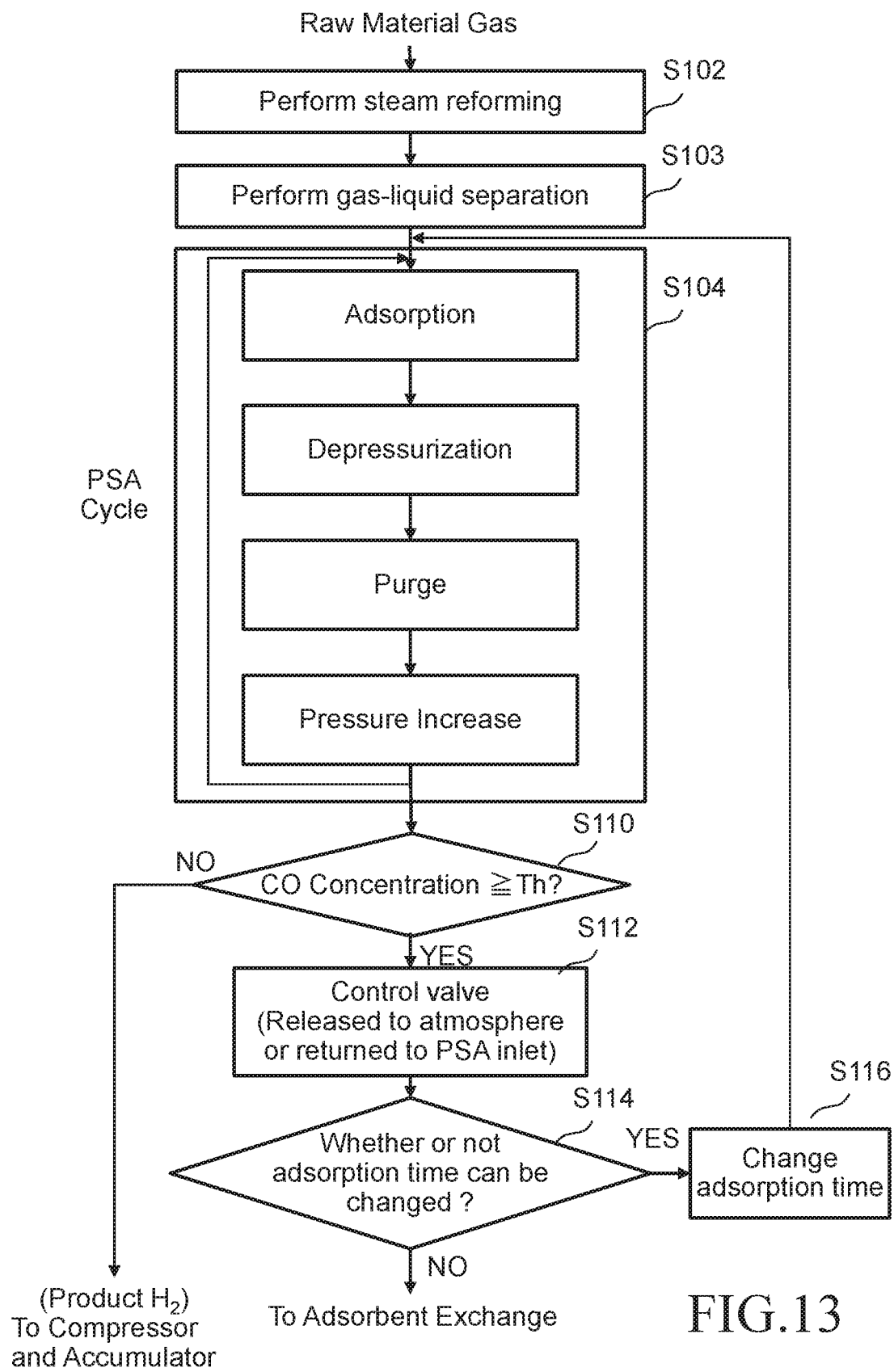
FIG. 13 is a flowchart showing main steps of a hydrogen production method in an embodiment.

FIG. 13 is a flowchart showing main steps of a hydrogen production method in the embodiment. In FIG. 13, the hydrogen production method in the embodiment executes a series of steps including a steam reforming step (S102), a gas-liquid separation step (S103), a pressure swing adsorption (PSA) step (S104), a CO concentration determination step (S110), a valve opening control step (S112), an adsorption time determination step (S114), and an adsorption time change step (S116). The pressure swing adsorption (PSA) method in the embodiment executes the pressure swing adsorption (PSA) step (S104), the CO concentration determination step (S110), and the valve opening control step (S112), among these steps.

In the steam reforming step (S102), the steam reformer 200 performs steam reforming using LPG as raw material gas. First, the LPG in the tank 600 is supplied to the desulfurizer 202, and the desulfurizer 202 removes a sulfur component from the LPG. The desulfurized raw material gas is reacted with steam in an environment of, for example, 700° C. to 800° C. by the reformer 204, and generates hydrogen $H_2$ and carbon monoxide CO by steam reforming. The raw material gas that has passed through the reformer 204 reacts the carbon monoxide CO of the raw material gas and the steam, in an environment of, for example, 320° C. to 400° C. by the transformer 206, and changes them to hydrogen $H_2$ and carbon dioxide $CO_2$. Further, a steam/carbon ratio is set to 2 to 4. By such processing, hydrogen-rich gas having a hydrogen purity of, for example, about 70% can be purified.

In the gas-liquid separation step (S103), the gas subjected to the steam reforming is subjected to gas-liquid separation by the gas-liquid separator 300, and is introduced into the PSA device 100.

By the above processing, the hydrogen-rich introduced gas introduced into the PSA device 100 can contain CO, $CH_4$, $CO_2$, $C_2H_6$, $H_2O$, $NH_3$, $H_2S$, HCHO, and HCOOH as impurity components. In particular, under the temperature conditions described in the steam reforming step (S102), hydrogen-rich gas containing 3 to 4 vol % of CO to be the canary component in the embodiment and 5 to 7.5 vol % of $CH_4$ to be easily desorbed next, among these impurity components, can be purified.

In the pressure swing adsorption (PSA) step (S104), the PSA device 100 introduces the hydrogen-rich gas (hydrogen fuel gas), and adsorbs the impurity components in the hydrogen fuel gas by using a pressure swing adsorption (PSA) method. In the PSA method, by performing an adsorption/desorption cycle (PSA cycle) in which an adsorption step, a depressurization step, a purge step, and a pressure increase step are repeated in each of the adsorption towers 10 (a to d), the impurities in the hydrogen fuel gas are removed. In the example of FIG. 1, the case where the four adsorption towers 10 (a to d) are disposed is shown. In this case, each of the adsorption towers 10 (a to d) can simultaneously perform one different step among the adsorption step, the depressurization step, the purge step, and the pressure increase step. For example, in a period in which the adsorption step is performed in the adsorption tower 10a, it is preferable to perform the pressure reduction (depressurization) step in the adsorption tower 10b, perform the purge step in the adsorption tower 10c, and perform the pressure increase step in the adsorption tower 10d. When the adsorption step in the adsorption tower 10a is completed, the adsorption step is started in the adsorption tower 10d. In a period in which the adsorption step is performed in the adsorption tower 10d, the pressure reduction (depressurization) step is performed in the adsorption tower 10a, the purge step is performed in the adsorption tower 10b, and the pressure increase step is performed in the adsorption tower 10c. Then, when the adsorption step in the adsorption tower 10d is completed, the adsorption step is started in the adsorption tower 10c. In a period in which the adsorption step is performed in the adsorption tower 10c, the pressure reduction (depressurization) step is performed in the adsorption tower 10d, the purge step is performed in the adsorption tower 10a, and the pressure increase step is performed in the adsorption tower 10b. Then, when the adsorption step in the adsorption tower 10c is completed, the adsorption step is started in the adsorption tower 10b. In a period in which the adsorption step is performed in the adsorption tower 10b, the pressure reduction (depressurization) step is performed in the adsorption tower 10c, the purge step is performed in the adsorption tower 10d, and the pressure increase step is performed in the adsorption tower 10a. By repeating the above operation, high-purity hydrogen gas can be continuously purified and discharged without interruption. Each step operates specifically as follows.

In the adsorption step, the impurity gas is adsorbed and removed by passing the raw material gas through the valve 20 from the gas introduction port side of the adsorption tower 10 filled with the adsorbent during a predetermined period under pressurization, so that the hydrogen gas is concentrated and purified. Then, high-purity hydrogen gas (product hydrogen gas) is discharged through the valve 24 or 26 from the gas discharge port side of the adsorption tower 10. In each adsorption tower 10, for example, it is preferable to set a temperature to 15 to 60° C., set a pressure to 0.8 MPaG (atmospheric pressure standard) or less higher than the atmospheric pressure, and set a gas space velocity (GHSV) to 500 to 1500 $h^{-1}$.

In the pressure increase step, first, the adsorption tower 10 under pressurization after completion of the adsorption step and the adsorption tower 10 near the atmospheric pressure after completion of the purge step are connected via, for example, the valve 26, and the internal pressure of the adsorption tower 10 after completion of the purge step is increased until the pressure is equalized by using the high-purity hydrogen gas discharged from the adsorption tower 10 after completion of the adsorption step. Then, a part of the high-purity hydrogen gas discharged by the adsorption tower 10 during the adsorption step is further supplied to the pressure-equalized adsorption tower 10 from the gas discharge port side through, for example, the valve 26 and pressurized, and the pressure thereof is increased to the adsorption pressure.

In the depressurization step, the adsorption step is completed, a part of the high-purity hydrogen gas is flown into the adsorption tower 10 for pressure increase to reduce the pressure in the adsorption tower 10, and the pressure in the adsorption tower 10 is further reduced to near the atmospheric pressure by exhausting the internal gas from the gas introduction port side through, for example, the valve 22. In this case, the impurity gas adsorbed on the adsorbent in the adsorption tower 10 is simultaneously exhausted from the gas introduction port side.

In the purge step, a part of the high-purity hydrogen gas discharged by the adsorption tower 10 during the adsorption step is supplied to the adsorption tower 10 after completion of the depressurization step from the gas discharge port side through, for example, the valve 26, and is simultaneously exhausted from the gas introduction port side through, for example, the valve 22, so that purge is performed. Thereby, the internal adsorbent can be cleaned and the adsorbent can be regenerated.

Figure 14:
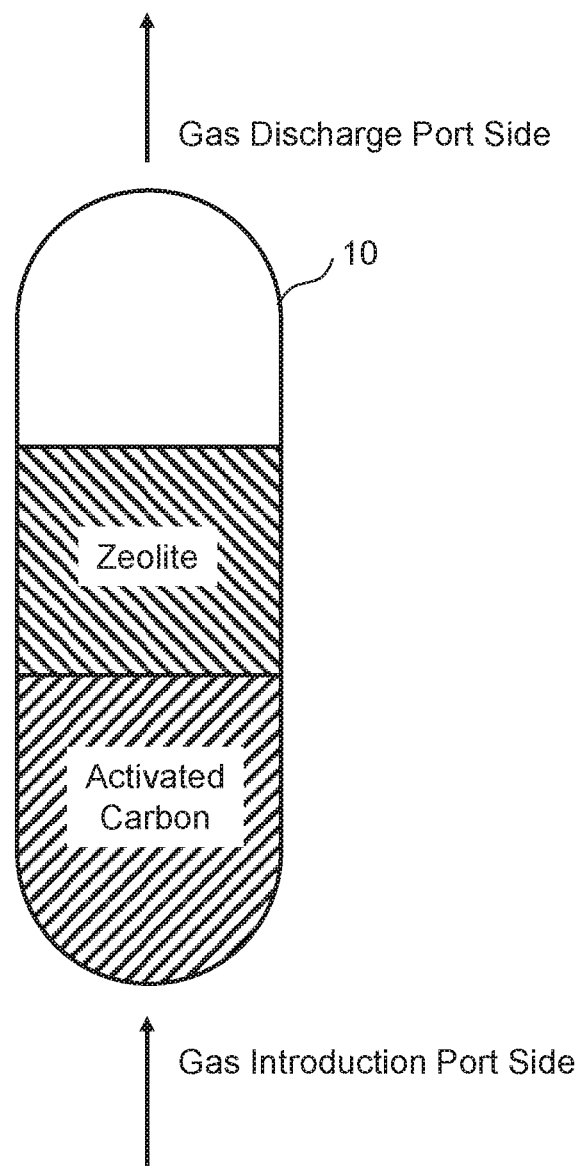
FIG. 14 is a diagram showing an example of a stack state of an adsorbent in an adsorption tower in an embodiment.

FIG. 14 is a diagram showing an example of a stack state of the adsorbent in the adsorption tower in the embodiment. The example of FIG. 14 shows a case where two layers of activated carbon and zeolite are stacked in order from the gas introduction port (lower) side in each of the adsorption towers 10 (a to d). However, the present invention is not limited thereto, and one layer of activated carbon may be disposed as described above.

The high-purity (the hydrogen purity is, for example, 99.97% or more) hydrogen gas discharged from each adsorption tower 10 (a to d) is supplied as low-pressure gas of less than 1 MPaG, for example, 0.7 MPaG through the valve 23 or 29 and 32, for example, to the compressor or the accumulator in the hydrogen station. In this case, for example, in the high-purity hydrogen gas that has passed through the valve 28, the CO concentration in the hydrogen fuel gas discharged from the adsorption tower is analyzed (detected) by the CO continuous analyzer 12 (densitometer). For example, the CO concentration is analyzed continuously or at predetermined sampling intervals (for example, at intervals of several milliseconds to several seconds). Note that, in the above description, the valve 24 and the valve 26 may be operated in parallel, using either of them. Similarly, the valve 28 and the valve 29 may be operated in parallel, using either of them.

In the CO concentration determination step (S110), the control circuit 14 determines whether the detected CO concentration is equal to or higher than a threshold. As the threshold, a value stricter than 0.2 volppm of the ISO standard is used. For example, the threshold is set to 0.1 volppm. If the detected CO concentration is less than the threshold, the gas is supplied as product gas to, for example, the compressor or the accumulator in the hydrogen station. Alternatively, the gas is accumulated in the accumulator 33 in the hydrogen production apparatus 500. In other words, the PSA device 100 adsorbs and removes the impurity components so that the CO concentration measured by the CO continuous analyzer 12 (densitometer) falls below the threshold. Then, when the CO concentration measured by CC continuous analyzer 12 falls below the threshold, the hydrogen production apparatus 500 accumulates the hydrogen gas as the product gas, for example, in the accumulator. Note that, at the time of starting up the hydrogen production apparatus 500, after reaching a stage where the CO concentration is purified to a value less than the threshold in the PSA device 100 (for example, after several tens of minutes), for example, the supply of gas to the compressor or the accumulator in the hydrogen station may be started. If the detected CO concentration is equal to or higher than the threshold, the process proceeds to the valve opening control step (S112).

In the valve opening control step (S112), when the CO concentration becomes equal to or higher than the threshold, the control circuit 14 controls the opening and closing of the plurality of valves so that the hydrogen gas discharged from the adsorption tower 10 is released to the atmosphere. Specifically, the valve 32 is closed to stop the supply of the product gas, and the valve 30 is opened to release the defective hydrogen gas to the atmosphere. Alternatively, after shortening the adsorption time in the adsorption time change step (S116) to be described later, the gas is returned to the introduced gas line of the PSA device.

In the adsorption time determination step (S114), the control circuit 14 determines whether or not the adsorption time can be changed. If the adsorption time in the adsorption step is long, CO easily performs breakthrough. Conversely, if the adsorption time is short, the pressure can be reduced before the CO performs breakthrough. On the other hand, if the adsorption time is too short, a hydrogen recovery rate decreases, and hydrogen production efficiency is deteriorated. Therefore, the control circuit 14 compares the set adsorption time with the shortest time in which the PSA cycle is enabled, and determines whether or not the adsorption time can be changed to the shortest time in which the PSA cycle is enabled (whether or not the adsorption time can be shortened). If the adsorption time can be changed, the process proceeds to the adsorption time change step (S116). If the adsorption time cannot be changed, the PSA device 100 is stopped. Then, the adsorbent in the adsorption tower 10 that has purified the defective hydrogen gas is exchanged. From the viewpoint of easy quality control, the adsorbents in all the adsorption towers 10 (a to d) are preferably exchanged. Then, the device may be operated again.

In the adsorption time change step (S116), the control circuit 14 changes (shortens) the set adsorption time. For example, the control circuit shortens the adsorption time in units of 10 seconds to 30 seconds. Then, the process returns to the PSA step (S104), and the steps after the PSA step (S104) are repeated. It goes without saying that, when the process returns to the PSA step (S104), similarly to the start-up of the hydrogen production apparatus 500, after reaching a stage where the CO concentration is purified to a value less than the threshold (for example, after several tens of minutes), the control circuit 14 starts supply of the product gas by closing the valve 30 and opening the valve 32.

As described above, the quality of hydrogen can be maintained by constantly monitoring the CO concentration with the CO continuous analyzer 12 (IR) using the CO concentration as an index. As described above, according to the method for controlling the canary component of CO, the quality can be secured constantly online without any outsourcing cost for analysis.

Here, in the above-described example, the case where, when CO is 3 to 4 vol % and $CH_4$ is 5 to 7.5 vol % as the composition ratio of CO and $CH_4$ in the introduced gas in which CO can be converted into the canary component by the PSA device 100, the volume ratio of activated carbon and zeolite can be adjusted between a ratio of 30:70 and a ratio of 100:0 (that is, only one layer of activated carbon) has been described. In the embodiment, an adsorption breakthrough test was further performed to confirm whether or not the above-described range of the composition ratio of CO and $CH_4$ of the gas introduced into the PSA device 100 according to the embodiment was a limit value. The composition ratio of CO and $CH_4$ of the introduced gas can be changed by adjusting the parameters of the steam reformer 200. In the embodiment, the composition ratio of CO and $CH_4$ is changed within a range where supply to the FCV is enabled.

FIG. 15 is a diagram showing a relation between a composition ratio of CO and $CH_4$ of introduced gas and a volume ratio of activated carbon and zeolite in the embodiment. As shown in FIG. 15, in the above-described steam reforming step (S102), the temperature of the reformer 204 is set to 650° C. to 700° C. and the temperature of the transformer 206 is set to 250° C. to 320° C., so that it is possible to purify the hydrogen-rich gas containing CO of 0.5 to 3 vol % and $CH_4$ of 7.5 to 10 vol % as the composition ratio of CO and $CH_4$ in the introduced gas. When CO is 0.5 to 3 vol % and $CH_4$ is 7.5 to 10 vol % as the composition ratio of CO and $CH_4$ in the introduced gas, it is confirmed that CO can be converted into the canary component when the volume ratio of activated carbon and zeolite is a ratio of 100:0 (that is, only one layer of activated carbon).

Further, the temperature of the reformer 204 is set to 7000° C. to 800° C. and the temperature of the transformer 206 is set to 320° C. to 400° C., so that it is possible to purify the hydrogen-rich gas containing CO of 3 to 4 vol % and $CH_4$ of 5 to 7.5 vol % as the composition ratio of CO and $CH_4$ in the introduced gas. When CO is 3 to 4 vol % and $CH_4$ is 5 to 7.5 vol % as the composition ratio of CO and $CH_4$ in the introduced gas, it is confirmed that CO can be converted into the canary component when the volume ratio of activated carbon and zeolite is between a ratio of 30:70 and a ratio of 100:0.

Further, as shown in FIG. 15, in the above-described steam reforming step (S102), the temperature of the reformer 204 is set to 800° C. to 900° C. and the temperature of the transformer 206 is set to 400° C. to 450° C., so that it is possible to purify the hydrogen-rich gas containing CO of 4 to 6 vol % and $CH_4$ of 0.4 to 5 vol % as the composition ratio of CO and $CH_4$ in the introduced gas. When CO is 4 to 6 vol % and $CH_4$ is 0.4 to 5 vol % as the composition ratio of CO and $CH_4$ in the introduced gas, it has been confirmed that CO can be converted into the canary component when the volume ratio of activated carbon and zeolite is between a ratio of 30:70 and a ratio of 60:40.

Therefore, in the embodiment, when the hydrogen gas containing CO of 0.5 vol % or more and 6.0 vol % or less and $CH_4$ of 0.4 vol % or more and 10 vol % or less as the impurity components is used as the introduced gas, CO can be converted into the canary component by using an adsorbent of one layer of activated carbon or an adsorbent of two layers in which activated carbon and zeolite are stacked. Further, from the above results, it has been confirmed that a gas space velocity (GHSV) obtained by dividing an amount of gas passing through a processing device per hour by the volume of the adsorbent in the device is established in a range of 500 to 1500 $h^{-1}$. The gas space velocity is more preferably set to GHSV: 700 to 1000 $h^{-1}$.

As described above, according to the embodiment, the quality control of the hydrogen gas of the component composition supplied to the FCV can be constantly performed. Therefore, quality control of the hydrogen gas for the FCV can be constantly performed. Further, as described above, the hydrogen gas of the component composition supplied to the FCV can be used not only for fuel for the FCV but also for other applications such as, for example, a home fuel cell. Therefore, quality control can be similarly performed for applications other than the fuel of the FCV.

The embodiments have been described with reference to the specific examples. However, the present disclosure is not limited to these specific examples.

Further, descriptions of parts and the like that are not directly necessary for explanation of the present invention, such as the device configuration and the control method, are omitted. However, the necessary device configuration and control method can be appropriately selected and used.

In addition, all pressure swing adsorption (PSA) devices, hydrogen production apparatuses, and hydrogen production methods that include the elements of the present invention and can be appropriately designed and modified by those skilled in the art are included in the scope of the present invention.

What is claimed is:

1. A pressure swing adsorption (PSA) device comprising:
   an adsorption tower configured to introduce hydrogen gas and adsorb impurity components in the hydrogen gas by using a pressure swing adsorption (PSA) method, an adsorbent of one layer made of activated carbon or an adsorbent of two layers in which activated carbon and zeolite are stacked being disposed in the adsorption tower, the hydrogen gas containing carbon monoxide (CO) of 0.5 vol % or more and 6.0 vol % or less and methane ($CH_4$) of 0.4 vol % or more and 10 vol % or less as the impurity components;
   a densitometer configured to detect a concentration of CO in hydrogen gas discharged from the adsorption tower, wherein the impurity components are adsorbed and removed to cause the CO concentration measured by the densitometer to fall below a threshold;
   a plurality of valves including: at least a first one of the plurality of valves disposed on a gas introduction port side of the adsorption tower, at least a second one of the plurality of valves disposed on a gas discharge port side of the adsorption tower, and at least a third one of the plurality of valves having an inlet connected to and disposed downstream of an outlet of the at least the second one of the plurality of valves;
a hydrogen gas supply line connected to an outlet of the at least the third one of the plurality of valves, wherein the hydrogen gas supply line includes: a first line branching to the atmosphere, a second line branching to a compressor, and an intermediate line that connects the first line and the second line;
the plurality of valves further including a first line valve provided to the first line and a second line valve provided to the second line;
wherein the densitometer is provided to the intermediate line that connects the first line and the second line; and
a control circuit configured to control the plurality of valves to open and close to release hydrogen gas discharged from the gas discharge port side of the adsorption tower to the atmosphere or to return hydrogen gas to the gas introduction port side of the adsorption tower in a case that the CO concentration measured by the densitometer is equal to or higher than the threshold.

2. The pressure swing adsorption (PSA) device according to claim 1,
wherein the adsorbent of one layer made of activated carbon of 100 vol % or the adsorbent of two layers in which activated carbon of 30 vol % or more and less than 100 vol % and zeolite of more than 0 vol % and 70 vol % or less are stacked is disposed as the adsorbent.

3. The pressure swing adsorption (PSA) device according to claim 1,
wherein the adsorbent of two layers in which activated carbon of 50 vol % or more and 60 vol % or less and zeolite of 40 vol % or more and 50 vol % or less are stacked is disposed as the adsorbent.

4. The pressure swing adsorption (PSA) device according to claim 1,
wherein the adsorbent of one layer made of activated carbon of 100 vol % is disposed as the adsorbent, and
the hydrogen gas contains carbon monoxide (CO) of 0.5 vol % or more and 3 vol % or less and methane ($CH_4$) of 7.5 vol % or more and 10 vol % or less as the impurity components.

5. The pressure swing adsorption (PSA) device according to claim 1,
wherein the adsorbent of two layer in which activated carbon of 30 vol % or more and 60 vol % or less and zeolite of 40 vol % or more and 70 vol % or less are stacked is disposed as the adsorbent, and
the hydrogen gas contains carbon monoxide (CO) of 4 vol % or more and 6 vol % or less and methane ($CH_4$) of 0.4 vol % or more and 5 vol % or less as the impurity components.

6. The pressure swing adsorption (PSA) device according to claim 1, wherein CO is a canary component.

7. A pressure swing adsorption method comprising:
introducing hydrogen gas into an adsorption tower and adsorbing impurity components in the hydrogen gas by using a pressure swing adsorption (PSA) method, an adsorbent of one layer made of activated carbon or an adsorbent of two layers in which activated carbon and zeolite are stacked being disposed in the adsorption tower, the hydrogen gas containing carbon monoxide (CO) of 0.5 vol % or more and 6.0 vol % or less and methane ($CH_4$) of 0.4 vol % or more and 10 vol % or less as the impurity components;
detecting, with a densitometer, a concentration of CO in hydrogen fuel gas discharged from the adsorption tower,
wherein the impurity components are adsorbed and removed to cause the CO concentration to fall below a threshold;
providing a plurality of valves including: at least a first one of the plurality of valves disposed on a gas introduction port side of the adsorption tower, at least a second one of the plurality of valves disposed on a gas discharge port side of the adsorption tower, and at least a third one of the plurality of valves having an inlet connected to and disposed downstream of an outlet of the at least the second one of the plurality of valves;
providing a hydrogen gas supply line connected to an outlet of the at least the third one of the plurality of valves, wherein the hydrogen gas supply line includes: a first line branching to the atmosphere, a second line branching to a compressor, and an intermediate line that connects the first line and the second line;
providing the plurality of valves to further include a first line valve provided to the first line and a second line valve provided to the second line;
providing the densitometer to the intermediate line that connects the first line and the second line; and
controlling the plurality of valves to open and close to release hydrogen gas discharged from the gas discharge port side of the adsorption tower to the atmosphere or to return hydrogen gas to the gas introduction port side of the adsorption tower in a case that the CO concentration measured by the densitometer is equal to or higher than the threshold.

8. The pressure swing adsorption method according to claim 7, further comprising:
detecting CO as a canary component.

9. A pressure swing adsorption (PSA) device comprising:
an adsorption tower configured to introduce hydrogen gas and adsorb impurity components in the hydrogen gas by using a pressure swing adsorption (PSA) method, a plurality of layers of adsorbents including an adsorbent of one layer made of activated carbon or an adsorbent of two layers in which activated carbon and zeolite are stacked being disposed in the adsorption tower, the hydrogen gas containing carbon monoxide (CO) of 0.5 vol % or more and 6.0 vol % or less and methane ($CH_4$) of 0.4 vol % or more and 10 vol % or less as the impurity components;
a densitometer configured to detect a concentration of CO in hydrogen gas discharged from the adsorption tower,
wherein the impurity components are adsorbed and removed to cause the CO concentration measured by the densitometer to fall below a threshold; and
a plurality of valves including: at least a first one of the plurality of valves disposed on a gas introduction port side of the adsorption tower, at least a second one of the plurality of valves disposed on a gas discharge port side of the adsorption tower, and at least a third one of the plurality of valves having an inlet connected to and disposed downstream of an outlet of the at least the second one of the plurality of valves;
a hydrogen gas supply line connected to an outlet of the at least the third one of the plurality of valves, wherein the hydrogen gas supply line includes: a first line branching to the atmosphere, a second line branching to a compressor, and an intermediate line that connects the first line and the second line;

the plurality of valves further including a first line valve provided to the first line and a second line valve provided to the second line;

wherein the densitometer is provided to the intermediate line that connects the first line and the second line; and a control circuit configured to control the plurality of valves to open and close to release hydrogen gas discharged from the gas discharge port side of the adsorption tower to the atmosphere or to return hydrogen gas to the gas introduction port side of the adsorption tower in a case that the CO concentration measured by the densitometer is equal to or higher than the threshold.

10. The pressure swing adsorption (PSA) according to claim 9, wherein CO is a canary component.

11. A pressure swing adsorption method comprising:

introducing hydrogen gas into an adsorption tower and adsorbing impurity components in the hydrogen gas by using a pressure swing adsorption (PSA) method, a plurality of layers of adsorbents including an adsorbent of one layer made of activated carbon or an adsorbent of two layers in which activated carbon and zeolite are stacked being disposed in the adsorption tower, the hydrogen gas containing carbon monoxide (CO) of 0.5 vol % or more and 6.0 vol % or less and methane ($CH_4$) of 0.4 vol % or more and 10 vol % or less as the impurity components;

detecting a concentration of CO in hydrogen fuel gas discharged from the adsorption tower, wherein the impurity components are adsorbed and removed to cause the CO concentration to fall below a threshold;

providing a plurality of valves including: at least a first one of the plurality of valves disposed on a gas introduction port side of the adsorption tower, at least a second one of the plurality of valves disposed on a gas discharge port side of the adsorption tower, and at least a third one of the plurality of valves having an inlet connected to and disposed downstream of an outlet of the at least the second one of the plurality of valves;

providing a hydrogen gas supply line connected to an outlet of the at least the third one of the plurality of valves, wherein the hydrogen gas supply line includes: a first line branching to the atmosphere, a second line branching to a compressor, and an intermediate line that connects the first line and the second line;

providing the plurality of valves to further include a first line valve provided to the first line and a second line valve provided to the second line;

providing the densitometer to the intermediate line that connects the first line and the second line; and controlling the plurality of valves to open and close to release hydrogen gas discharged from the gas discharge port side of the adsorption tower to the atmosphere or to return hydrogen gas to the gas introduction port side of the adsorption tower in a case that the CO concentration measured by the densitometer is equal to or higher than the threshold.

12. The pressure swing adsorption method according to claim 11, further comprising: detecting CO as a canary component.

* * * * *